Oct. 16, 1962 — C. A. EFF — 3,059,088
OVEN THERMOSTAT SHIELDING SYSTEM
Filed Aug. 8, 1960 — 2 Sheets-Sheet 1
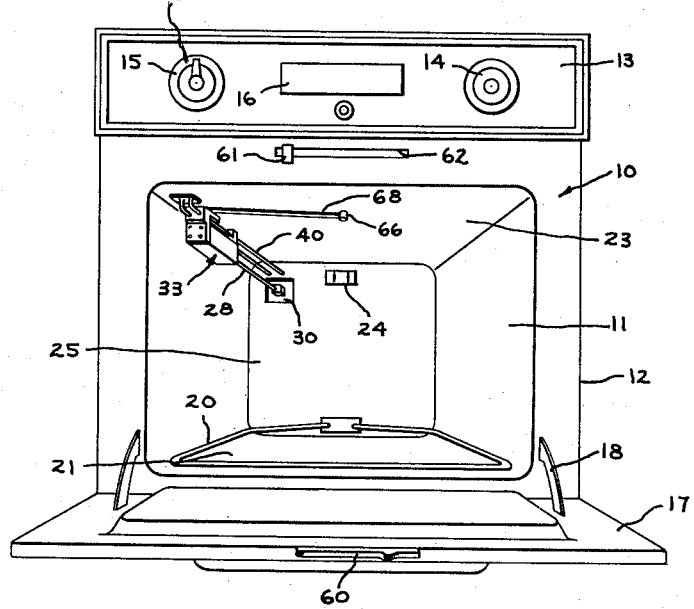
FIG. 1
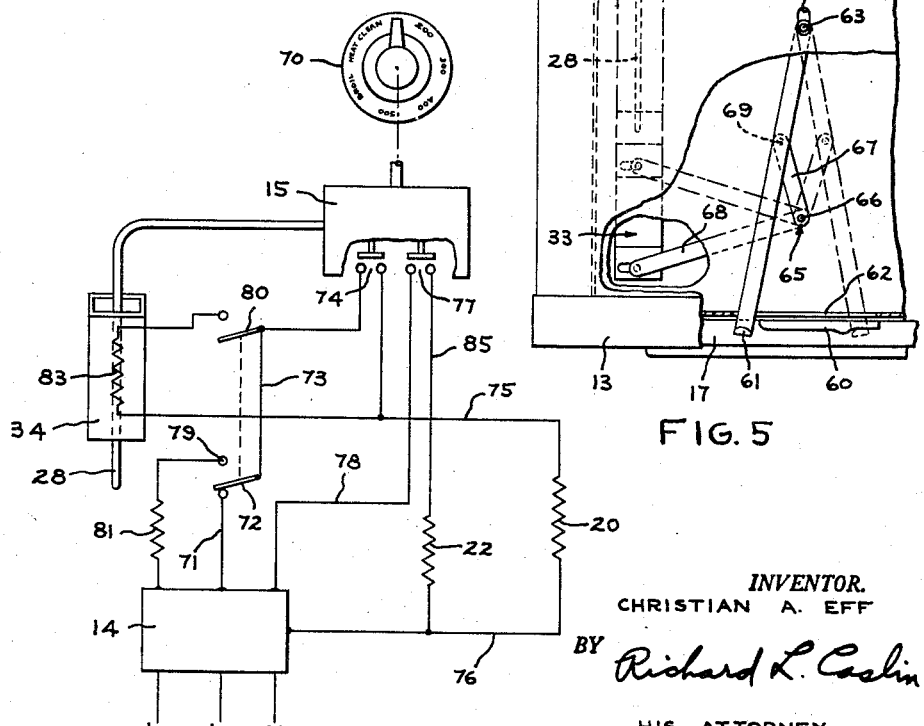
FIG. 4
FIG. 5
INVENTOR.
CHRISTIAN A. EFF
BY Richard L. Caslin
HIS ATTORNEY Oct. 16, 1962 C. A. EFF 3,059,088
OVEN THERMOSTAT SHIELDING SYSTEM
Filed Aug. 8, 1960 2 Sheets-Sheet 2
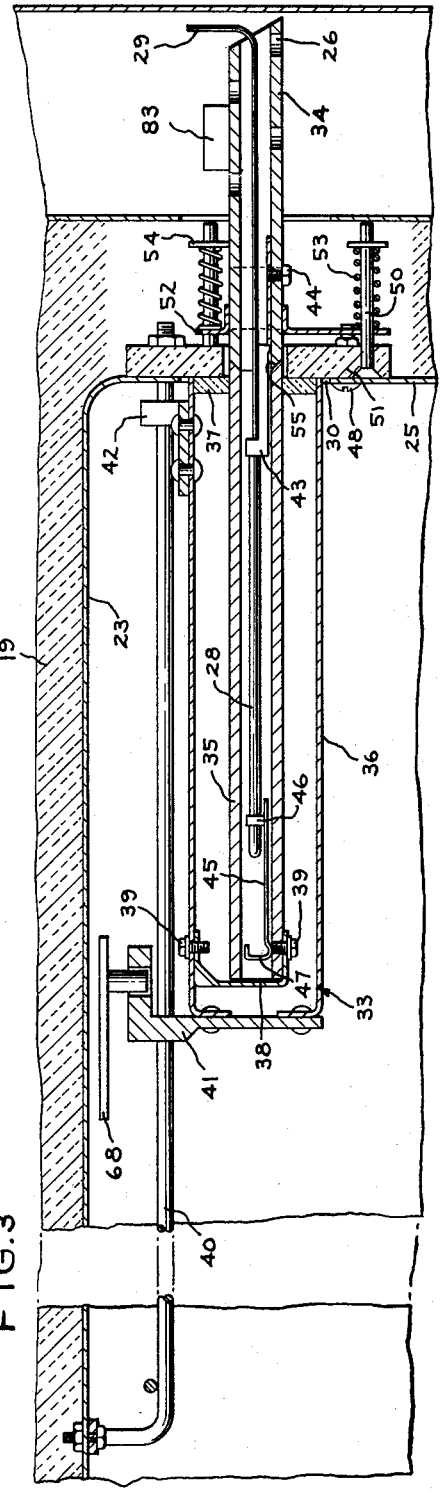
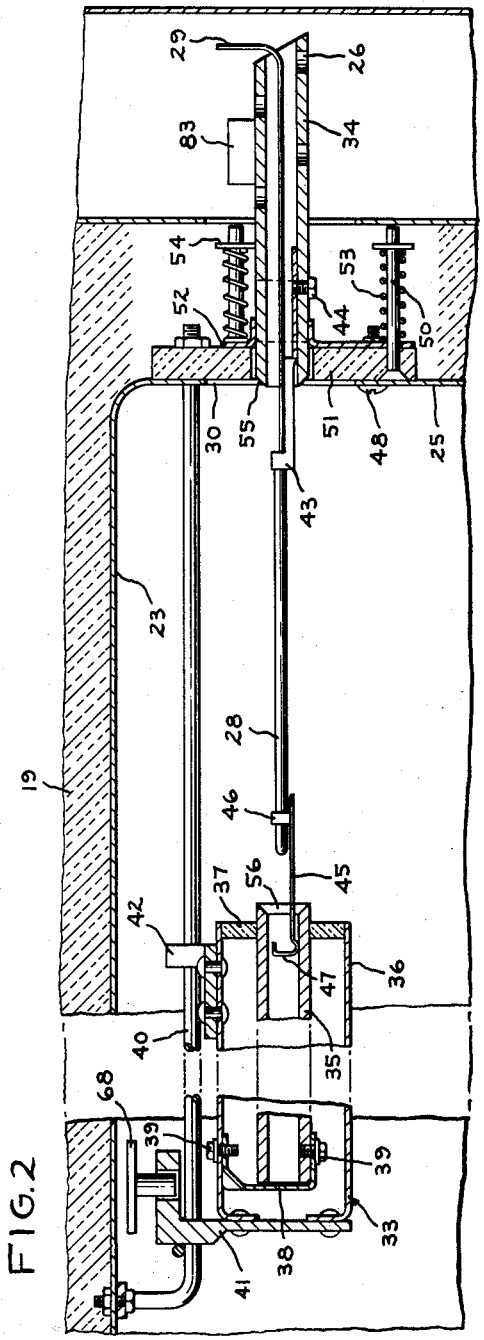
INVENTOR.
CHRISTIAN A. EFF
BY Richard L. Caslin
HIS ATTORNEY

United States Patent Office 3,059,088
Patented Oct. 16, 1962

3,059,088
OVEN THERMOSTAT SHIELDING SYSTEM
Christian A. Eff, Louisville, Ky., assignor to General Electric Company, a corporation of New York
Filed Aug. 8, 1960, Ser. No. 48,002
8 Claims. (Cl. 219—35)

The present invention relates to range ovens for domestic use and particularly to a means of protecting a thermostat probe in a domestic oven where the temperatures rise above 600° F.

Hydraulic thermostats having an elongated bulb or probe formed on the end of a capillary tube that is joined to a bellows or diaphragm within the thermostat housing have been widely used as oven thermostats for many years. The normal oven cooking temperatures have been below about 550° F. maximum, and the thermally responsive fluid used in the hydraulic control system has been able to withstand this amount of temperature without difficulty, but the known thermally responsive fluids cannot be operated at temperatures much above this value.

This invention contemplates the provision of a protective arrangement for the thermally responsive fluid so that a thermostat of the hydraulic type may be used successfully as a control element in the oven described in the co-pending application of Bohdan Hurko, Serial No. 27,926, filed May 9, 1960, which application is assigned to the General Electric Company, the assignee of this invention; as there described and claimed the oven is provided with an automatic cleaning cycle where the temperature of the oven is raised to a heat cleaning temperature within the range between 750° F. and 950° F. so as to burn off all food soil and leave the walls of the oven cavity perfectly clean.

The principal object of the present invention is to provide a shielding means for the bulb of a hydraulic thermostat without moving the bulb so that the thermostat may operate in an oven having a temperature range as high as 950° F. without failure.

A further object of this invention is to provide cooling means for the movable shielding means of the thermostat bulb of a hydraulic thermostat to draw off the heat of the shielding means and cool the bulb when there is an abnormally high temperature in the oven.

The present invention is incorporated in an oven which has heating means capable of and controllable to elevate the oven temperature to a level materially in excess of 600° F. in accordance with the disclosure of the aforementioned co-pending application of Bohdan Hurko. For controlling the heating means a hydraulic thermostat is provided having a fixed bulb filled with a thermally responsive liquid arranged to be placed in a heat sensitive position within the oven. During normal cooking operations the thermostat bulb is not only exposed to heating by convection but also to the radiant heat energy of the heating means of the oven. Before the range controls are set to place the oven in an automatic heat cleaning cycle the shield is moved over the thermostat bulb and the oven door is closed and latched so that the door may not be opened while the heat cleaning cycle is in progress. Means are also provided for dissipating the heat of the shielding means outside of the oven by means of a cooling means that is engageable with the shielding means when the shield overlies the bulb.

My invention will be better understood from the following description taken in connection with the accompanying drawings and its scope will be pointed out in the appended claims.

FIGURE 1 is a front elevational view in perspective of a built-in wall oven showing one embodiment of the present invention with the shielding means for the thermostat bulb positioned adjacent the top wall of the oven liner and being shown in its position where the bulb is exposed for use during a normal cooking operation;

FIGURE 2 is a right side fragmentary elevational view in cross-section taken just to the right of the thermostat bulb shielding system of FIGURE 1 showing the shielding means with the thermostat bulb exposed;

FIGURE 3 is a right side elevational view in cross-section similar to that of FIGURE 2 showing the shielding means moved over the thermostat bulb which is the position it will be in during the heat cleaning cycle;

FIGURE 4 is an energizing circuit diagram for the heating elements of the oven showing the oven switch and oven thermostat in the circuit as well as a biasing heater cooperating with the thermostat to deenergize the heating elements of the oven once the oven temperature reaches the maximum heat cleaning temperature; and FIGURE 5 is a top plan cross-sectional view taken over the top wall of the oven liner to show the latching mechanism for the door and the connection between the shielding means and the latch so that the bulb is automatically shielded when the door is latched.

Referring in detail to the drawing and in particular to FIGURE 1, this invention has been shown in one form as applied to an electric built-in wall oven 10. Of course, it will be understood that certain portions of this invention may also be incorporated in ovens heated with gas, or the oven could be an integral part of a free-standing range. Traditionally, range ovens include an oven liner 11, thermal insulation 19 in FIGURE 2 packed around the outside of the oven liner, and an oven cabinet or body 12 for encompassing the various elements of the oven and providing a decorative outer covering with a pleasing appearance for the kitchen. Located above the oven liner is a control panel 13 containing the various control components such as the oven switch 14, an oven thermostat 15, and an oven clock and timer 16. The front of the oven liner 11 is open and it is adapted to be closed by a front-opening drop door 17 which is hinged to the oven cabinet along its bottom edge by a pair of hinge straps 18.

Heating means must be provided in the oven for both normal cooking operations as well as for the automatic heat cleaning cycle. This oven would include the two standard heating elements; namely, the bake unit 20 adjacent the bottom wall 21 of the oven liner and a broil unit 22 shown in the circuit diagram of FIGURE 4 although missing from FIGURE 1 as it is located just under the top wall 23 of the oven liner and its presence in FIGURE 1 would tend to obscure the understanding of the shielding system for the thermostat bulb to be described hereinafter. It should suffice to say that a standard broil unit 22 is plugged into an electrical connector 24 mounted in the back wall 25 of the oven liner.

In order for the thermostat 15 to control the energization of the heating elements 20 and 22 within the oven it is necessary for the thermostat to have a sensing device within the oven cavity for determining the oven temperature and signaling this temperature to the thermostat so that the thermostat may act upon this informaion and control this temperature to the degree predetermined by the thermostat setting. Such a sensing device is represented by a thermostat bulb 28 of an elongated tubular shape that is joined to the thermostat by a capillary tube 29 as is shown in FIGURE 2. A temperature responsive fluid fills the bulb and capillary tube for acting upon a bellows or diaphragm (not shown) of the thermostat 15. This thermostat may be of any suitable hydraulic type, but I prefer to use a thermostat of the general type disclosed in the United States patent to W. J. Ettinger 2,260,014, dated October 21, 1941.

The temperature responsive fluid may be phenyl diphenyl chloride, or any other similar high temperature compound being marketed under various chemical trade names. The thermostat bulb 28 extends through an opening 30 in the back wall 25 of the oven liner for projecting from back to front thereof. As mentioned previously, the broil unit 22 is not illustrated in FIGURE 1 although it would be used since it is standard equipment in electric ranges for obtaining the proper cooking results. It is well that the bulb 28 be low enough as measured from the top wall 23 of the oven liner so that the bulb is below the broil unit 22 and unobstructed therefrom for proper temperature sensing and control.

The subject oven is not a standard oven as it is heated and controlled in such a manner that the temperature in the oven cavity may rise above the maximum cooking temperature of about 550° F. to a maximum heat cleaning temperature in the vicinity of 950° F. so that all food soil and grease spatter covering the walls of the oven liner will be burned off automatically, and no hand scrubbing of the oven walls will be necessary to obtain clean oven surfaces, as is contemplated by the aforementioned co-pending application of Hurko. The conventional fluid for a hydraulic thermostat could not be used in such a high temperature oven because the fluid will not withstand a temperature above about 600° F. before it starts to chemically decompose and lose its important properties. Also the copper bulb and capillary tube begin to soften and oxidize at 700° F. This oxidation action can continue for only a short time before the fluid will begin to leak out and render the thermostat inoperative.

I propose to protect the fluid in the thermostat bulb 28 under high temperature conditions by isolating the bulb from the oven without moving the bulb. I have chosen to use a shield 33 which in one extreme position uncovers the bulb during normal cooking operations and in another extreme position completely covers the bulb and isolates the bulb from the temperature within the oven cavity. While the shield 33 intercepts the heat before it reaches the bulb, the heat must be drawn away from the shield by a cooling means before it can be transferred to the bulb. Such a cooling means for the shield is represented by a cooling fin 34 that is supported on the back of the oven liner over the opening 30 of the back wall 25 so that the shield and cooling fin are in heat transfer relation when the shield covers the bulb 28 as is best seen in FIGURE 3. The shield 33 has an inner casing 35 in the form of a thick-walled aluminum cylinder, and a spaced sheet metal outer casing 36 of aluminum or aluminized steel. The inner casing is centered within the outer casing by an annular ceramic disk 37 at the open end of the shield, while there is a bracket 38 of stainless steel material hanging from the top of the outer casing and supporting the opposite end of the inner casing using screw fasteners 39.

It is necessary to move the shield 33 between two positions within the oven so that the shield either exposes the bulb 28 or covers the bulb completely. Hence a pair of slide rails 40 have been mounted on the underside of the top wall 23 of the oven liner so that the shield 33 may be suspended from the rails by sliders 41 and 42 at each end of the shield respectively. Grey cast iron material has been found to work very well for these sliders 41 and 42 under these extreme high temperatures of around 950° F. because this type iron has an inherent characteristic of self-lubrication so that the frictional forces do not become excessive.

The cooling fin 34 is also a thick-walled aluminum cylinder similar to the inner casing 35 of the shield. It may contain perforations such as 26 so that a natural draft of air passing up behind the oven may pass through the cooling fin and over the capillary tube 29. The capillary tube 29 extends through the center of the cooling fin 34, and the bulb 28 is supported at one end from the fin 34 by a stainless steel clip member 43 to cut down heat transfer. This clip is clamped at one end to the bulb and is fastened at its opposite end within the cooling fin by a fastening screw 44. The free end of the bulb 28 is supported by a cantilever support member 45 that is clamped at one end to the bulb as at 46 while its opposite end is turned up into a partial loop 47 for a smooth sliding action within the inner casing 35. This support member 45 may be made of stainless steel material which is of low thermal conductivity to restrict the heat transfer from the bulb to the shield during normal cooking as seen in FIG. 2.

It is well to provide a firm connection between the shield 33 and cooling fin 34 when the shield protects the bulb so that the heat from the shield may be conducted quickly to the outside of the oven liner. In order to permit normal manufacturing tolerances, the cooling fin 34 is resiliently mounted to the back wall 25 by means of fixed bolts 50 supported from a thermally insulating block 51 that overlies the opening 30 in the back wall 25 of the oven liner and is held in place by screw fasteners 48. These bolts 50 extend through suitable openings in a collar member 52 that is fixed to the cooling fin 34. A coil spring 53 is supported on each bolt 50 and is sandwiched between the collar 52 and speed fasteners 54 which slip over the ends of the bolts. The cooling fin 34 is slidably mounted on the bolts 50 by the collar member 52 and resiliently pressed against the supporting block 51 so that the innermost end 55 of the cooling fin 34 is only slightly visible in the back wall 25 of the oven liner as is seen in FIGURE 2. This end 55 of the cooling fin 34 is beveled while the mating end 56 of the inner casing 35 of the shield 33 is countersunk to provide a large area of contact under spring pressure between the shield and cooling fin as is best seen in FIGURE 3.

Damage would occur to the fluid in the thermostat bulb 28 if the housewife were to inadvertently omit moving the shield 33 over the bulb before starting the heat cleaning cycle. This possibility is prevented by connecting the shield 33 to a latching mechanism for the door as is illustrated in the top plan cross-sectional view of FIGURE 5. This latching mechanism and its connection with the shield 33 does not form part of my invention, for it is illustrated and claimed in a co-pending application of Raymond L. Dills, application Serial No. 59,942 which was filed on October 3, 1960, and is assigned to the General Electric Company, the assignee of the present invention. The oven door must be latched to prevent the opening of the door when the temperatures in the oven are above the normal cooking temperatures that is in the range between 550° F. and 950° F. If the door were to be opened during a heat cleaning cycle and a large amount of grease were to be present within the oven there is a possibility of a flash fire occurring as room air rushes into the oven. Safety interlocking features (not shown) are combined with the latching mechanism so that it is not possible to commence the heat cleaning cycle until the door is latched. Secondly, the latch would be interconnected with the heating elements in such a way that once the heat cleaning cycle were commenced the door could not be unlatched, even though the heating elements were deenergized, until the temperature dropped below a safe temperature in the vicinity of 550° F.

As is seen in FIGURES 1 and 5 the top edge of the oven door 17 is provided with a sloping cam surface 60 which is acted upon by a sliding latch member 61 pivotally mounted in the oven cabinet above the oven liner and slidable within an elongated slot 62 in the front of the oven cabinet 12. The visible end of the latch 61 serves as both a handle and a sliding guide that cooperates with the cam 60 of the door. Hence, when the latch is thrown from the one extreme position to the other the door will be either disengaged by the latch, or engaged by the latch and pulled tightly shut and locked for the heat cleaning cycle. The latch member 61 is in the form of a horizontal link that is pivotably connected as at 63 in FIGURE 5 within an elongated slot 64. A lever mechanism 65 that appears in the form of an offset bell crank lever is pivotably connected about a vertical axis within the oven body as at 66 and has a pair of arms 67 and 68. The shorter arm 67 is arranged above the oven liner and is pivotably connected as at 69 to an intermediate portion of the latch 61. The longer arm 68 is offset from the arm 67 by being in a lower plane so that it may be located within the oven as is shown in FIGURE 1 and be pivotally connected to the shield 33. Hence, as seen in FIGURE 5 when the latch 61 is in the left hand extreme position as is shown in full lines the shield 33 will uncover the bulb 28. The dotted line position of the latching mechanism illustrates that when the latch is thrown to the right hand extreme position the shield 33 automatically moves over the bulb 28.

An energizing and control circuit diagram for the oven is shown in FIGURE 4. Electrical power is supplied from a 236 volt source on a 3-wire system identified as neutral N, and lines L1 and L2 having a voltage of 118 volts between each line L1 and L2 and the neutral N and 236 volts across L1 and L2. The manual controls include an oven switch 14 and thermostat 15. Switch 14 would be a rotary switch having five settings or switch positions; namely, Off, Bake, Time Bake, Broil, and Heat Clean. The purpose of the thermostat 15 is to control and hold the bake temperature at the different bake settings of the oven switch as well as to allow the oven to obtain the high heat cleaning temperature when desired. The thermostat 15 includes a dial 70 having suitable markings representing bake temperature settings as well as a separate setting for heat cleaning.

The controls are designed to operate in a conventional manner for cooking. For example, if it were desired to bake in the oven the thermostat 15 would be set to the proper temperature setting and the oven switch 14 would be moved to the bake setting. A circuit would be established from line L2 through lead 71, switch contact blade 72, lead 73, through closed thermostat contacts 74, lead 75, through bake unit 20, and lead 76 back to line L1. At the same time the oven switch 14 will also connect the neutral line N to lead 78 through closed thermostat contacts 77, to lead 85 to the broil unit 22 through lead 76 back through the switch to line L1. A circuit for the broiling operation may be traced from line L1 through lead 78 and closed thermostat contacts 77, broil unit 22, and lead 76 to line L1. When it is desired to operate the heat cleaning cycle, the switch contact blade 72 is moved to engagement with contact 79. The switch contact blade 72 is also joined to a second switch contact blade 80 so that they are insulated from each other although they move in unison for reasons which will be explained hereinafter. This setting of the switch blade 72 places a third heating element 81 in series with the bake unit 20 across a 236 volt supply. Hence the circuit is from line L2 through the switch 14, through heater 81, contact 79, switch contact blade 72, lead 73, thermostat contacts 74, lead 75, bake unit 20, lead 76, switch 14 to line L1.

This third heater element 81 is a mullion heater that is wrapped around the outside of the oven liner adjacent the door to replenish the heat lost through the door during the heat cleaning cycle as is covered by the previously mentioned Hurko application which is co-pending herewith. Attention is directed to the fact that a high impedance heater 83 is shunted across the thermostat contacts 74. Hence, when the oven temperature reaches the maximum heat cleaning temperature ranging from 750° to 950° F. the contacts 74 will open and current will flow through the high impedance heater 83. This heater 83 is insulated from the cooling fin 34 but is in heat transfer relation thereto so that when it is energized it biases the thermostat bulb and holds the heater elements deenergized to serve as an automatic cut-off for the heat cleaning cycle so that the housewife need not remain with the oven during the heat cleaning operation.

Having described above my invention of a shielding means for a hydraulic oven thermostat, it will be readily apparent to those skilled in this art that modifications may be made in the various elements. For example, instead of locating the thermostat bulb from back to front of the oven the bulb might be brought into the oven through one of the side walls and extend along the back wall of the oven liner. Also, instead of having a sliding support for the shielding means a swinging radial arm might be used to support the shield. Moreover, instead of having a shielding means formed with inner and outing casings as shown the shield might include thermal insulation such as fiberglass or the like material. The shielding system could also be designed so that its sole function would be to protect the thermostat during the cleaning cycle, while the high temperature control of the oven during the cleaning cycle is provided by a second control means. Furthermore this same invention could be incorporated with the probe of an electric thermostat so that less expensive materials could be used due to the exposure of the probe to reduced temperatures.

Other modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A thermostatic control system for controlling the heating means for an electric oven comprising a bulb within said oven, a temperature responsive fluid filling said bulb for controlling said heating means responsively to the expansion and contraction of the fluid, and protective means for preventing excessive temperature rise in said fluid including shielding means which is movable over the thermostat bulb, and cooling fin means outside of said oven but engageable in heat conducting relation with the shielding means when the shielding means is moved over the said bulb, the cooling fin means serving to draw off the heat in the shielding means when they are in heat conducting relation with each other so that the temperature of the bulb may be held down below a predetermined high temperature within the oven.

2. A thermostatic control system for controlling the heating means for an electric oven as recited in claim 1 wherein the oven includes supporting means on which the shielding means is adjustably mounted so that during normal cooking operations the shielding means may be removed from over the bulb, while during a predetermined high temperature operation of the oven the shielding means may be moved over the thermostat bulb and into heat conducting relation with the said cooling fin means, both the shielding means and the cooling fin means being of materials of good thermal conductivity, the shielding means including a thermal insulating means to limit the heat transfer from the shielding means to the bulb.

3. A range oven comprising an oven liner having a bottom wall, parallel side walls, a top wall, a back wall, and an open front that is closed by an oven door, a heating means for raising the temperature of the oven for normal cooking operations ranging up to 550° F. as well as for an automatic heat cleaning operation at temperatures between about 750° F. and 950° F. whereby food soil is burned off the walls of the oven liner and the inner door surface, a hydraulic thermostat for sensing and controlling the temperature within the oven comprising a bulb formed on the end of a capillary tube that leads from the thermostat, a temperature responsive fluid filling said bulb for controlling said heating means responsively to the expansion and contraction of the fluid, and movable shielding means exposing said bulb during normal cooking operations and completely covering said bulb during the automatic heat cleaning operation, and cooling means external of the oven liner for cooperation with the shielding means during the heat cleaning operation to draw off the heat within the shielding means so that the temperature of the bulb may be held down below the temperature within the oven cavity.

4. A range oven as recited in claim 3 wherein the shielding means is slidably supported on the walls of the oven linear and thermally isolated from the bulb to restrict the heat transfer between the shielding means and the bulb.

5. A range oven as recited in claim 3 wherein the said cooling means comprises a cooling fin mounted exteriorly of the oven liner with the capillary tube of the thermostat bulb extending therethrough so that when the shielding means covers the bulb the shielding means is in good thermal conducting relation with the cooling fin.

6. A range oven as recited in claim 5 wherein the cooling fin is resiliently mounted against the outer wall of the oven liner, the shielding means being pressed against the said resilient means of the cooling fin when the shielding means completely covers the thermostat bulb so that both the shielding means and the cooling fin means are resiliently biased together in heat conducting relation.

7. A range oven as recited as in claim 3 wherein there is a high impedance heater in thermal contact with the cooling fin means but electrically insulated therefrom, said heater being shunted across the thermostat so that when the thermostat opens as the oven temperature reaches a predetermined amount current will flow through the heater which will bias the thermostat bulb to hold the thermostat open and de-energize the said heating means of the oven.

8. A thermostatic control system for controlling the heating means for an oven comprising a probe within said oven for sensing the oven temperature, and protective means for preventing excessive temperature rise of said probe including shielding means which is movable over the probe, and cooling fin means outside of said oven but engageable in heat conducting relation with the shielding means when the shielding means is moved over the probe, the cooling fin means serving to draw off the heat in the shielding means when they are in heat conducting relation with each other so that the temperature of the probe may be held down below a predetermined high temperature within the oven.

References Cited in the file of this patent
UNITED STATES PATENTS

| | | |
|---|---|---|
| 2,025,302 | Olds | Dec. 24, 1935 |
| 2,076,096 | Samuels et al. | Apr. 6, 1937 |
| 2,260,014 | Ettinger | Oct. 21, 1941 |
| 2,279,064 | Rutenber | Apr. 7, 1942 |